United States Patent Office 3,356,614
Patented Dec. 5, 1967

3,356,614
FILM REMOVING COMPOSITION

Theodore E. Gilbert, Westlake, Ohio, assignor to Hooker Chemical Corporation, Niagara Falls, N.Y., a corporation of New York No Drawing. Filed Sept. 6, 1966, Ser. No. 577,194
4 Claims. (Cl. 252—171)

ABSTRACT OF THE DISCLOSURE

A paint stripping composition containing trichloroethylene and as a stripping activator therefore a mixture of acetic acid and trichloroacetic acid, wherein the ratio of acetic acid to trichloroacetic acid in this mixture is within the range of about 1:1 to 2.2:1. The process of removing paint and similar coating using this composition is also covered. The preferred stripping composition contains from 50 to 98% of trichloroethylene, from 0.01 to 6% of water and from 0.5 to 15% of the activator composition.

This is a continuation-in-part of my co-pending application Ser. No. 216,732, filed Aug. 14, 1962, now abandoned.

This invention relates to improved film removing compositions and more particularly relates to an improved activator for increasing the effectiveness of such compositions.

Heretofore, various organic solvents have been used for the removal of films, such as paint, enamel, varnish and lacquer, from various surfaces, such as metal, wood, and the like. Although such compositions have been employed with varying degrees of effectiveness, it has been found that those compositions employing the more flammable organic solvents, such as benzene, various ketones and derivatives thereof, had not been completely satisfactory, notwithstanding generally effective film removing characteristics. In addition to their flammability, such organic solvents are also frequently toxic, thereby presenting a health hazard to those working in close proximity with them.

Recently, in an effort to overcome these difficulties, and particularly that of flammability, more and more use has been made of the chlorinated aliphatic hydrocarbon solvents in film stripping compositions. Exemplary of such solvents which have been used are methylene chloride and trichloroethylene. While such solvents, in general, have a very low flash point or even no flash point at all, thus overcoming the problem of flammability, their film removing efficiency frequently is unsatisfactory. In order to overcome this difficulty, various activators for these chlorinated aliphatic hydrocarbon solvents have been proposed. Typical of such activators are various organic acids such as formic acid, acetic acid, propionic acid, salicylic acid, butyric acid, carbolic acid, benzoic acid, and cinnamic acid. Such acid activators have been found to be particularly effective when used with film stripping compositions based on methylene chloride as the organic solvent. When used in such a composition, these activators have been found to increase the stripping efficiency of the methylene chloride several fold.

Although the methylene chloride based film stripping compositions, including such activators do give effective stripping efficiencies, the high volatility of the methylene chloride is a definite disadvantage to the use of these compositions. Moreover, methylene chloride is not always carried as a "stock" item by all chemical suppliers, so that users of such film stripping compositions must maintain a considerable inventory of the methylene chloride. For these reasons, it is very desirable if trichloroethylene, rather than methylene chloride, can be utilized as the organic solvent in these film stripping compositions.

Because of its lower volatility, and more ready availability, thus eliminating the necessity for maintaining large inventories, trichloroethylene is a much more desirable organic solvent for use in these film stripping compositions than is methylene chloride. Unfortunately, however, the aforementioned activators which have been found to be effective in increasing the stripping efficiency of methylene chloride have not been found to be similarly effective with trichloroethylene. For this reason, up to the present time, no completely satisfactory film stripping composition, based on trichloroethylene as the organic solvent, has been found.

It is, therefore, an object of the present invention to provide a new and novel activator for film stripping compositions based on trichloroethylene as the organic solvent.

Another object of the present invention is to provide an activator for film removing compositions based on trichloroethylene as the organic solvent, which activator produces a synergistic effect when used in combination with known acid activators.

A further object of the present invention is to provide a means for improving the film stripping efficiency of stripping compositions based on trichloroethylene as the organic solvent.

A still further object of the present invention is to provide an improved method of removing films from surfaces.

These and other objects of the present invention will become apparent to those skilled in the art, from the description of the invention which follows.

It has now been found that the effectiveness of film removing compositions based on trichloroethylene as the organic solvent is markedly improved by adding thereto an activating proportion of a combined activator comprised of acetic acid and trichloroacetic acid. The improvement in the stripping effectiveness of this composition is particularly surprising in that the known activators for chlorinated aliphatic hydrocarbon solvents such as methylene chloride, e.g., organic acids such as acetic acid, have been found to be noticeably ineffective in activating trichloroethylene based stripping compositions. More specifically, it has been found that when using acetic acid, alone, as an activator for trichloroethylene based film stripping compositions, there is little if any increase in the stripping efficiency of the trichloroethylene. When trichloroacetic acid is used in conjunction with the acetic acid activator, the stripping efficiency of the trichloroethylene is greatly increased. Moreover, it is found that this increase is considerably greater than the additive increases in efficiency obtained when using acetic acid or trichloroacetic acid alone, thus clearly showing the synergistic effect of the novel activators of the present invention.

It will be appreciated by those skilled in the art that in addition to the trichloroethylene and the novel activator of the present invention, the film stripping compositions may contain minor amounts of various other constituents, such as additional solvents, viscosity increasing agents, corrosion inhibitors, wetting agents, emulsifying agents, and the like. Generally, the amounts and types of these additional constituents used will depend upon the particular application for which the film stripping composition is intended. In this regard, it is to be noted that there is no universal film stripping composition which will be effective on all types of films. Accordingly, depending on the specific type of paint, enamel, varnish, lacquer or the like, which is to be removed, variations will be made in the composition of the stripping material. For this reason, it is not possible to set forth a specific stripping composition which will be effective in all instances.

In general, however, the stripping compositions of the present invention will contain a major amount of trichloroethylene. Generally, the trichloroethylene will be present in an amount within the range of about 50 to about 98 percent by weight of the total composition. In addition, the film stripping compositions of the present invention will contain an activating proportion of the novel activator of the present invention. Generally, the activator will be present in the stripping composition of the present invention in an amount within the range of about 0.5 to about 15 percent by weight of the total composition, with an amount within the range of about 6 to 8 percent by weight being specifically preferred. It will, of course, be appreciated that, in some instances, amounts of the activator of less than 0.5 percent or in excess of about 15 percent of weight of the total composition may also be used without detrimentally effecting the stripping efficiency of the composition. Generally, the combined activator will contain the acetic acid and trichloroacetic acid in a ratio of 1:1 to 2.2:1, the trichloroacetic acid desirably being present in an amount not substantially in excess of about one-half of the total activator content. Preferably, the ratio of acetic acid to trichloroacetic acid in the activator used will be about 2 to 1.

In addition to the solvent and the activator, the film stripping compositions of the present invention preferably also contain a small amount of water. The improvement in stripping efficiency which is brought about by including a small amount of water in the stripping composition is well known in the art. It is believed that the water in the composition functions as a synergistic chemical agent in that it increases the activity of the solvent activator which is included in the composition. In this manner, there is obtained a remarkably enhanced stripping efficiency of the trichloroethylene. Preferably, the amount of water included in the composition should be no greater than that which is capable of going into solution with the remaining constituents of the composition, whereby the composition will remain in a single phase. Generally, it has been found that satisfactory results are obtained when the water used is in an amount within the range of about 0.01 to about 6 percent by weight of the total composition.

In addition to the above components, the film stripping compositions of the present invention may contain various other constituents such as additional solvent or blending agent, thickening or viscosity increasing agents, corrosion inhibitors, wetting agents, emulsifying agents, evaporation retardants, and the like. As has been indicated hereinabove, these additional constituents are not essential components of the present film stripping compositions and will only be included in the composition depending upon the characteristics of the film which is to be removed. Exemplary of additional solvents or blending agents which may be included in the present composition are methanol, ethanol, butanol, toluene, diacetone alcohol, o-dichlorobenzene, nitroethane, and benzene. Generally, these materials will be present in amounts up to about 15 percent by weight of the total composition. As thickening or viscosity increasing agents, various water dispersable resins may be used such as methylcellulose, ethylcellulose, carboxymethylcellulose, carboxyethylcellulose, butylcellulose, and the like. Generally, these materials will be present in the composition in an amount up to about three percent by weight of the total film stripping composition.

A typical evaporation retardant which uay be used in the present film stripping composition is paraffin wax. Other similar materials may also be used with equally good results. Such evaporation retardant agents will generally be present in the subject composition, in amounts up to about one percent by weight of the total composition.

Exemplary of corrosion or rust inhibitors which may be included in the present composition are various phosphate compounds, such as triethylammonium phosphate, trimethylammonium phosphate, trimethylaminedihydrogen phosphate, trimethylammoniumdihydrogen phosphate, and tributylammonium phosphate. Generally, these corrosion inhibitors will be present in the composition in amounts up to about one percent by weight of the total composition.

Various wetting and/or emulsifying agents may be included in the present composition, depending upon the wetting or emulsifying characteristics desired in the composition. Examples of such materials are the alkylated aromatic sodium sulfonates, such as dodecylbenzenesodium sulfonate, sulfonated kerosene, alkylphenoxy polyethoxyethanols, such as octylphenoxy polyethoxyethanol, alkali metal salts of fatty acids, such as potassium oleate, and the like. Additionally, where the latter materials are used, small quantities of a fatty acid, such as oleic acid may be added to give greater wettability and further to reduce the hydrolytic tendency of the potassium oleate. Generally, the wetting and/or emulsifying agents will be present in the instant composition in amounts up to about five percent by weight of the total composition.

It will be appreciated by those skilled in the art that frequently the above wetting and/or emulsifying agents, as well as some of the additional solvents or blending agents, will contain appreciable quantities of water, e.g., up to 25 or 30 percent by weight. These materials thus serve as a convenient means for adding the required water to the composition, thereby making it unnecessary to add water separately. Accordingly, in making up the film stripping composition of the present invention, the trichloroethylene, or similar solvent, the activator, as well as any desired additional solvents, thickeners, evaporation retardants, corrosion inhibitors, wetting and/or emulsifying agents and the like are admixed and any additional water required, over that supplied by the constituents can then be added. The thus-prepared composition can then be applied to the surface from which the film is to be removed in any convenient manner. For example, the stripping composition may be applied to the surface by brushing or smearing and allowed to remain on the surface for a sufficient time to effect a loosening or softening of the film. Thereafter, the film may be removed by washing with water or by scraping. Such a procedure is generally used where the film to be removed covers a substantial area. Where only small surfaces are involved, particularly in the case of small parts of intricate design, it may be more convenient to dip the parts or pieces into a body of the stripping composition. In such instances, the pieces being treated will remain in the stripping composition for a sufficient period of time to completely coat them with the composition and will then be withdrawn. Thereafter, the film can be removed by washing with a stream of water, or by scraping.

By using the novel activator of the present invention the stripping efficiency of trichloroethylene, is greatly enhanced. By thus improving the stripping efficiency of trichloroethylene, the advantages of trichloroethylene in a film stripping composition can be obtained. As has been indicated hereinabove, these advantages include a lower volatility than the presently used organic solvents, such as methylene chloride. Additionally, the more readily availability of trichloroethylene, as a stock item, makes it possible to reduce the solvent inventory required.

In order that those skilled in the art may better understand the present invention and the manner in which it may be practiced, the following specific examples are given.

*Example 1*

To illustrate the synergistic effect of trichloroacetic acid when used with an acetic acid, as the activator, the following four formulations were made:

| Components | Parts by Weight | | | |
|---|---|---|---|---|
| | A | B | C | D |
| Methylene chloride | 814 | | | |
| Trichloroethylene | | 814 | 814 | 814 |
| Glacial acetic acid | 65 | 65 | | 65 |
| Trichloroacetic acid | | | 65 | 30 |
| $H_2O$ | 11.8 | 11.8 | 11.8 | 11.8 |
| Paraffin | 6.5 | 6.5 | 6 5 | 6.5 |
| Methyl cellulose (4,000 cps.) | 6.5 | 6.5 | 6.5 | 6.5 |
| Sulfonated kerosene | 32.9 | 32.9 | 32.9 | 32.9 |
| Methanol | 62.5 | 62.5 | 62.5 | 62.5 |

Test panels were made by coating the SAE 10/10 steel panels with "Du Pont Deluxe Enamel 707-6741" over "Bonderite 100." The average film thickness on each side of the panel was 1.2 mils. The coated panels were then baked until the enamel was hard. One of these panels was immersed in each of the above formulations and the following results were obtained: A, 60% strip in 6 minutes; B, 5% strip in 6 minutes; C, 80% strip in 5 minutes; D, 100% strip in 1 minute.

*Example 2*

The procedure of the previous example was repeated with the following formulation being used:

| Components: | Parts by wt. |
|---|---|
| Trichloroethylene | 814 |
| Glacial acetic acid | 30 |
| Trichloroacetic acid | 30 |
| $H_2O$ | 11.8 |
| Methyl cellulose (4000 cps.) | 6.5 |
| Sulfonated kerosene | 32.9 |
| Methanol | 62.5 |

Panels similar to those used in Example 1 were tested in the manner of Example 1 with the following result: 100% strip in 3½ minutes.

The above results clearly show that when trichloroacetic acid and glacial acetic acid are used in combination as an activator, the stripping efficiency of the trichloroethylene is far greater than the mere additive efficiencies when using glacial acetic acid or trichloroacetic acid alone. These results clearly show the synergistic effect obtained when using the combination of glacial acetic acid and trichloroacetic acid as activators for trichloroethylene.

While there have been described various embodiments of the invention, the methods and compositions described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A film stripping composition consisting essentially of from about 50 to about 98 percent of trichloroethylene, from about 0.01 to about 6% of water and from about 0.5 to about 15% of a combined activator consisting essentially of acetic acid and trichloroacetic acid, wherein the ratio of acetic acid to trichloroacetic acid is within the range of 1:1 to 2.2:1.

2. The composition as claimed in claim 1 wherein the ratio of acetic to trichloroacetic acid is about 2:1.

3. A method for removing paint, enamel, varnish, and lacquer film from surfaces bearing such films which comprises applying to said surfaces a film softening amount of the film removing composition as claimed in claim 1.

4. The method as claimed in claim 3 wherein the ratio of acetic to trichloroacetic acid in the combined activator is about 2:1.

References Cited

UNITED STATES PATENTS

| | | | |
|---|---|---|---|
| 2,507,985 | 5/1950 | Kuentzel | 252—143 |
| 3,072,579 | 1/1963 | Newman | 252—143 |

LEON D. ROSDOL, *Primary Examiner.*

J. T. FEDIGAN, W. E. SCHULZ, *Assistant Examiners.*